US006313239B1

(12) United States Patent
Seyferth et al.

(10) Patent No.: US 6,313,239 B1
(45) Date of Patent: Nov. 6, 2001

(54) OLEFIN POLYMERIZATION WITH GROUP 4 METAL-CONTAINING ORGANOSILICON DENDRIMERS

(75) Inventors: Dietmar Seyferth, Lexington, MA (US); Ralf Wyrwa, Jena (DE); Uli W. Franz, Pittsburgh, PA (US); Sigurd Becke, Cologne (DE)

(73) Assignees: Bayer Corporation; Bayer A.G.; Massachusetts Institute of Technology

( * ) Notice: Subject to any disclaimer, the term of this patent is extended or adjusted under 35 U.S.C. 154(b) by 0 days.

(21) Appl. No.: 08/611,482

(22) Filed: Mar. 5, 1996

(51) Int. Cl.[7] .............................. C08F 4/646; C08F 4/656
(52) U.S. Cl. ....................... 526/126; 526/127; 526/160; 526/170; 526/281; 526/308; 526/335; 526/340.2; 526/348; 526/348.5; 526/352; 526/943
(58) Field of Search ....................... 526/126, 127, 526/160, 170, 904, 943, 348, 308, 281, 348.5, 352, 194, 335, 340.2; 556/9, 11; 528/31

(56) References Cited

U.S. PATENT DOCUMENTS

| | | | |
|---|---|---|---|
| 5,177,162 | * | 1/1993 | Matsuura et al. ............ 526/70 |
| 5,276,110 | * | 1/1994 | Zhou et al. . |
| 5,486,632 | * | 1/1996 | Devore et al. . |
| 5,491,246 | * | 2/1996 | Rosen et al. . |
| 5,512,693 | * | 4/1996 | Rosen et al. . |
| 5,539,068 | * | 7/1996 | Devore et al. . |

FOREIGN PATENT DOCUMENTS

| | | | |
|---|---|---|---|
| 0 230 707 | * | 5/1987 | (EP) . |
| 0 293 815 A1 | * | 12/1988 | (EP) . |
| 0 372 414 A2 | * | 6/1990 | (EP) . |
| 0 350 170 | * | 10/1990 | (EP) . |
| 0 593 875 A2 | * | 4/1994 | (EP) . |
| WO 97/32918 | * | 9/1997 | (WO) . |

OTHER PUBLICATIONS

Stephen C. Stinson, "Delving Into Dendrimers", C&EN, Sep. 22, 1997, pp. 28–30.*
Seyferth et al., Organometallics, 13 (1994) 2682–2690.*
Roovers et al., Macromolecules, 26 (1993) 4324–4331.*
Roovers et al., Polymer Preprints, 33 (1992) 182–183.*
Roovers et al., Abstracts of Papers of the American Chemical Society, 203 (1992) P200–Poly.*
Zhou et al., Macromolecules, 26 (1993) 963–968.*
Zhou et al., Rubber Chemistry And Technology, 65 (1992) 303–314.*
Thayer, C & EN, Sep. 11, 1995, 15–20.*
Tomalia et al., Angew. Chem. Int. Ed. Engl., 29 (1990) 138–175.*
Seyferth, "Polycarbosilanes: An Overview" in *Inorganic and Organometallic Polymers*, eds., M. Zeldin et al., American Chemical Society, Washington, DC, 1988, pp. 21–42.*
Curry, Journal of the American Chemical Society, 78, (1956) 1686–1689.*
Rubinsztajn, Journal of Inorganic and Organometallic Polymers, 4 (1994) 61–77.*
van der Made et al., J. Chem. Soc. Chem. Commun., (1992) 1400–1401.*
Mathias, et al., J. Am. Chem. Soc., 113, (1991) 4043–4044.*
Uchida et al., J. Am. Chem. Soc., 112, (1990) 7077–7079.*
Morikawa et al., Macromolecules, 24, (1991) 3469–3474.*
Alonso, et al., J. Chem. Soc. Chem. Commun., (1994) 2575–2576.*
Knapen et al., Nature, 372, (1994) 659–663.*
Seyferth et al., "Synthesis of an Organosilicon Dendrimer Containing 324 Si–H Bonds", *Organometallics,* vol. 13, No. 7, 1994, pp. 2682–2690.*
Muzafarov et al., "Organosilicon Dendrimers: Volume–Growing Polyallylcarbosilanes", *Polymer Science,* vol. 35, No. 11, 1993.*
Rubinsztajn, S., "Synthesis and Characterization of New Poly(siloxysilanes)", *Journal of Inorganic and Organometallic Polymers,* vol. 4, No. 1., 1994, pp. 61–73.*
Mathias, L. et al., "Hyperbranched Poly(siloxysilanes)," *J. Am. Chem. Soc.,* vol. 113, 1991, pp. 4043–4044.*

* cited by examiner

*Primary Examiner*—Fred Teskin
(74) *Attorney, Agent, or Firm*—Wolf, Greenfield & Sacks P.C.

(57) ABSTRACT

Group 4 metal-containing organosilicon dendrimers are described. Also described are methods for synthesizing the dendrimers. The dendrimers can be useful in several applications including as olefin polymerization and copolymerization catalysts and as silane polymerization catalysts.

10 Claims, 3 Drawing Sheets

US 6,313,239 B1

OLEFIN POLYMERIZATION WITH GROUP 4 METAL-CONTAINING ORGANOSILICON DENDRIMERS

The United States Government has rights in this invention pursuant to Contract No. CHE 9221212 awarded by the National Science Foundation.

BACKGROUND OF THE INVENTION

1. Field of the Invention

The invention relates to Group 4 metal-containing organosilicon dendrimers, methods of preparation thereof, and methods of use thereof.

2. Description of the Prior Art

Dendrimers are chemical compounds characterized by a regular, highly branched structure as shown schematically in FIG. 1. Dendrimer 10 of FIG. 1 is a second generation dendrimer, denoted by a generation number, $G_n$, equal to $G_2$. Dendrimer 10 includes an initiator core 12 from which branches, whose number is denoted by $N_n$ and characterized by length l, emanate. Four main branches ($N_1$=4) emanate directly from initiator core 12 and form four primary branch points 14 from each of which three new branches ($N_2$=3) emanate and form secondary branch points 16 as the next generation polymer is produced. Branches that emanate from branch points 16 terminate in end groups 20.

Dendrimers are ideally monodisperse, i.e., they consist of single, identical species, all of which have the same composition and molecular weight. Dendrimers can be characterized by a range of molecular weights, ranging from relatively low oligomeric molecular weight, to relatively high polymeric molecular weights. Dendrimer molecular weights can depend on several factors including length of the arms, the extent of arm branching, the functionality of the branching groups in the arms, the length of connecting groups between branching sites and the functionality of the dendrimer core. Typically, dendrimers are soluble in organic solvents and their solubility in a particular solvent can be optimized by the choice of appropriate functional groups for the end groups. However, end groups may be chosen so as to result in water solubility. Dendrimers of intermediate generation number, $G_n$, typically with n in the range of from about 1 to about 10, depending upon the dendrimer system, are characterized by an uncongested periphery with empty space between neighboring end groups. As such, intermediate generation number dendrimers have high surface areas and a relatively large proportion of unoccupied dendrimer interior volume.

Dendrimers can be synthesized using a "divergent procedure", according to which dendrimers are grown outward by repetitive chemical steps using a multifunctional central core molecule as the starting material. Alternatively, a "convergent procedure" can be used to synthesize dendrimers by preparing segments of the dendrimer first and then attaching the segments to a central core molecule.

A type of organosilicon dendrimers, carbosilane dendrimers, and their preparation are described in Seyferth et al., Organometallics, 13 (1994) 2682–2690. A typical dendrimer prepared in the foregoing study is shown in FIG. 2.

Thus, it would be highly desirable to exploit the foregoing dendrimer characteristics, including relatively high surface area and relatively high porosity, for applications including catalysis by preparation of dendrimers having end or interior group substituents with a desired chemical activity.

SUMMARY OF THE INVENTION

Many of the foregoing needs are met by an organosilicon dendrimer with one or more dendrimer arms containing a Group 4 metal such as Ti, Zr, or Hf or mixtures thereof. The invention provides dendrimers with Group 4 metal-containing end or interior group substituents, methods for making the dendrimers and polymerization methods that use the Group 4 metal-containing dendrimers as catalysts.

According to one aspect of the invention, a method for synthesizing such a dendrimer including a Group 4 metal substituent is provided. The method includes steps of (a) providing a core molecule containing one or more reactive functional groups; (b) providing a silicon hydride with an appropriate reactive functionality such as a silicon-halogen bond; (c) providing a hydrosilylation catalyst; (d) reacting the silicon hydride with the core molecule in the presence of the hydrosilylation catalyst to produce an intermediate organosilicon dendrimer; (e) reacting the intermediate organosilicon dendrimer to introduce an unsaturated organic functional group; (f) repeating steps (b), (c), (d), and (e) n times using the intermediate organosilicon dendrimer as formed in step (e) as the core molecule to produce a $G_n$ generation organosilicon dendrimer wherein n is an integer in the range of from about 1 to about 10 and $G_n$ is the generation number; and (g) reacting the $G_n$ generation organosilicon dendrimer with a Group 4 metal-containing reagent to form an organosilicon dendrimer including a Group 4 metal.

Another aspect of the invention provides a method for polymerizing an olefin including steps of contacting olefin monomers with an organosilicon dendrimer catalyst including a Group 4 metal, such as Ti, Zr, or Hf, or mixtures thereof, so that the olefin monomers are polymerized to form a polyolefin.

Yet another aspect of the invention is a dehydrogenative condensation polymerization of silane monomers, $RSiH_3$, to form a polysilane using the dendrimers of the invention as a catalyst.

DESCRIPTION OF PREFERRED EMBODIMENTS

Figure 1:
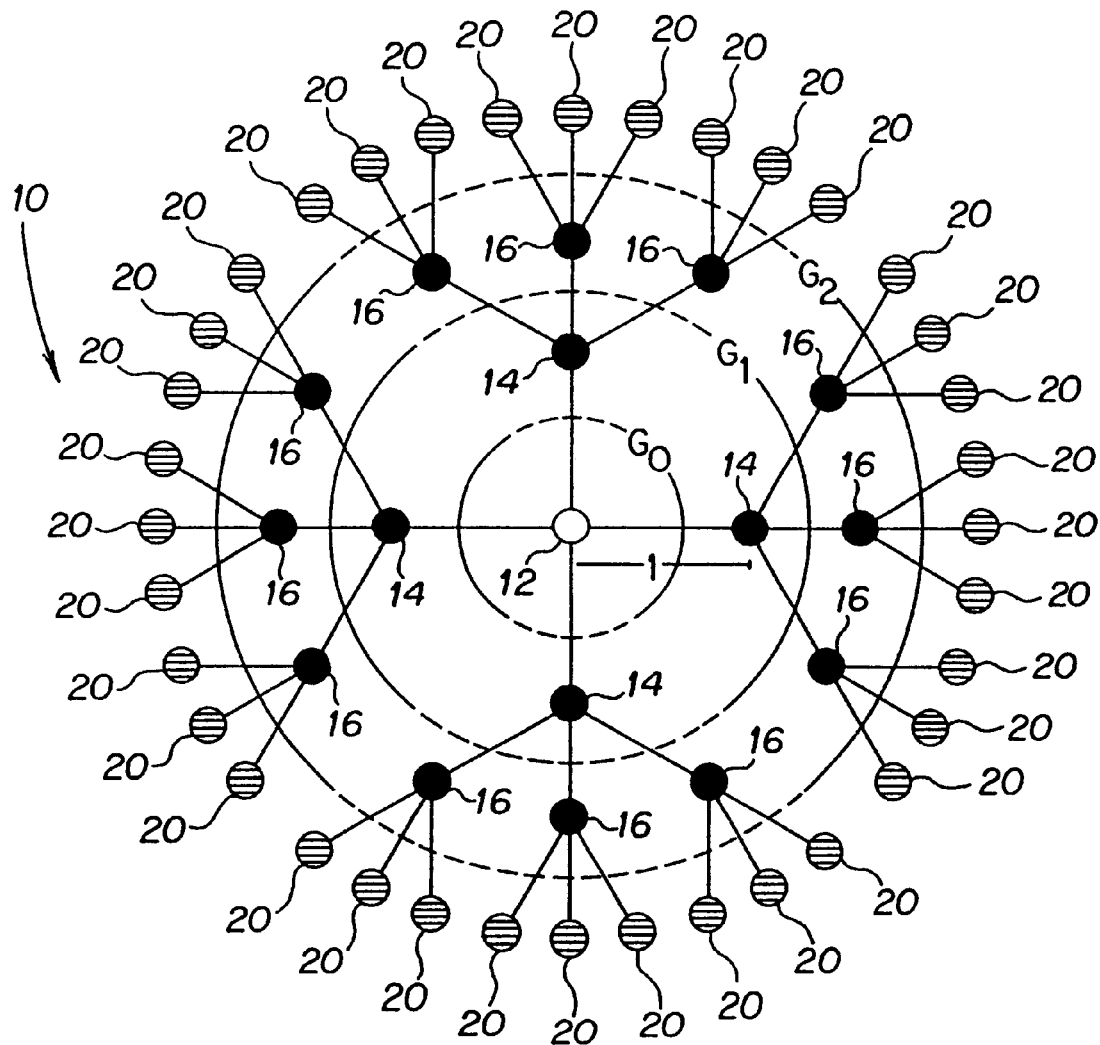
FIG. 1 is a schematic, generalized illustration of a typical dendrimer.
Figure 2:
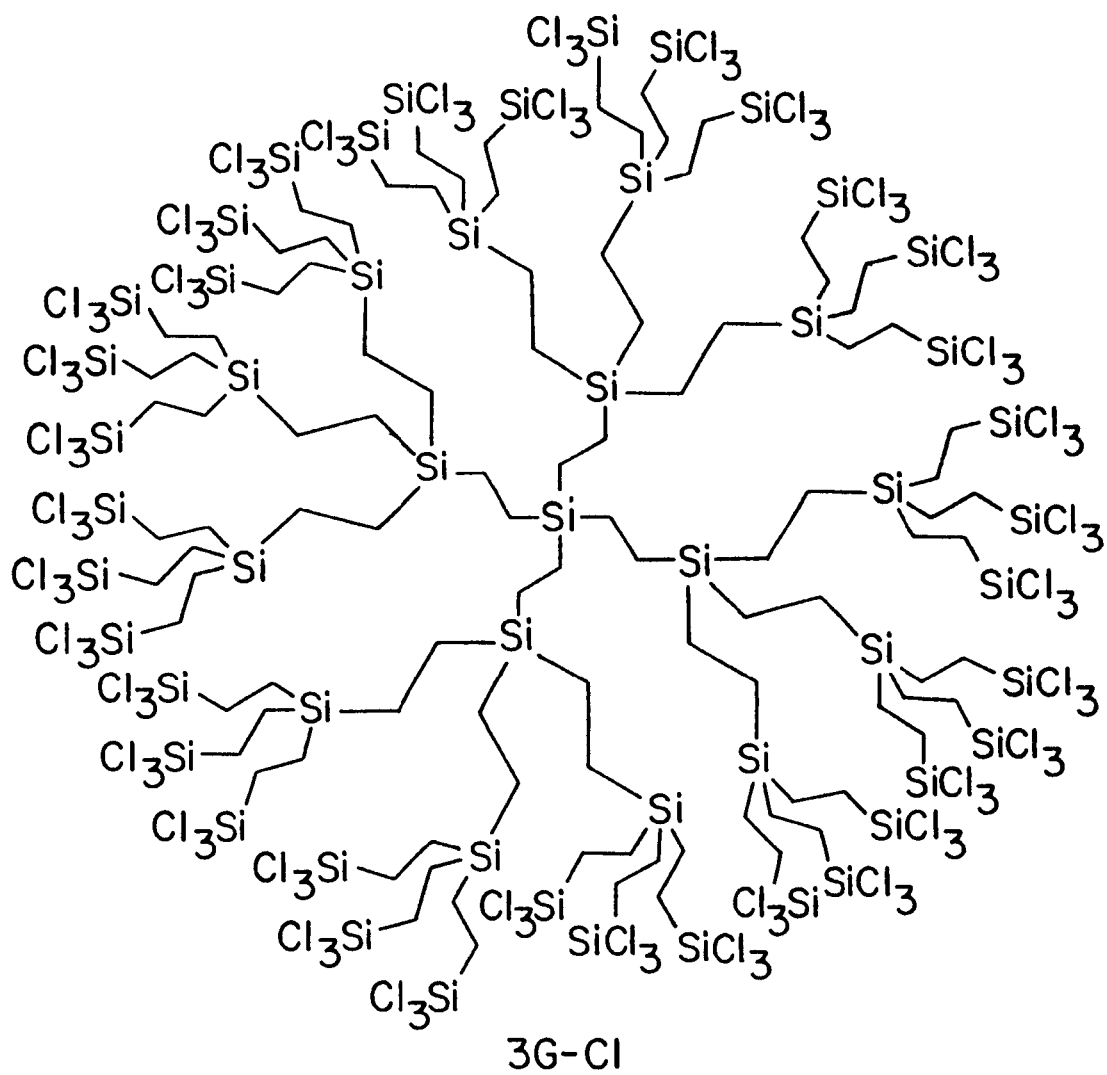
FIG. 2 is a schematic, generalized illustration of a typical dendrimer prepared according to the study described in Seyferth et al., Organometallics, 13 (1994) 2682–2690.

The Group 4 metal-containing organosilicon dendrimers can be carbosilanes or siloxanes or hybrids thereof. As used herein in the specification and claims, a "carbosilane" is an organosilicon compound with organic bridges between the silicon atoms. The bridges can be alkylene, such as $-CH_2-$, $-CH_2CH_2-$, $-(CH_2)_n-$, or substituted variants thereof; alkenylene, such as $-CH=CH-$, $-CH=CH-CH=CH-$, or substituted variants thereof; mixed alkylene/alkenylene, such as $-CH_2CH=CHCH_2-$; arylene, such as

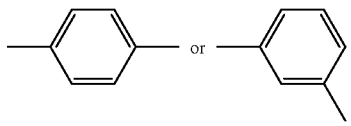

and substituted variants thereof; or heterocyclic groups such as

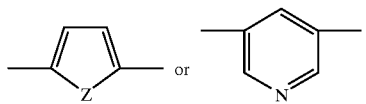

where Z is O, S, NH or NR and R is alkyl or aryl or the like. Carbosilanes are further defined and described in Seyferth, "Polycarbosilanes: An Overview", in *Inorganic and Organometallic Polymers*, (ACS Symposium Series 360), M. Zeldin et al., eds., American Chemical Society, Washington, D.C., 1988, pp. 21–42.

Organosilicon dendrimers that can be used in the present invention include, but are not limited to, the organosilicon dendrimers that will be described below. The following references are incorporated by reference. An organosilicon dendrimer or dendrimers grown from a tetraallylsilane core via successive hydrosilylation and allylation steps as described in A. W. van der Made et al., J. Chem. Soc., Chem. Commun. (1992) 1400–1401 can be used. Alternatively, an organosilicon dendrimer or dendrimers grown from a 1,3,5-$(CH_2=CHMe_2Si)_3C_6H_3$ core via successive hydrosilylation/vinylation or allylation steps can be used. A hybrid carbosilane/siloxane dendrimer or dendrimers grown by catalyzed oligomerization of $CH_2=CHSi(OSiMe_2H)_3$ as described in L. J. Mathias et al., J. Am. Chem. Soc., 113 (1991) 4043–4044 or of $HSi(OSiMe_2CH=CH_2)_3$ as described in S. Rubinsztain, J. Inorg. Organomet. Polym., 4 (1994) 61–72 can be used. Finally, a siloxane dendrimer or dendrimers such as those described in H. Uchida et al., J. Am. Chem. Soc., 112 (1990) 7077–7079 and in A. Morikawa, et al., Macromolecules, 24 (1991) 3469–3474 can be used.

A Group 4 metal-containing organosilicon dendrimer of the present invention can be further characterized by a dendrimer arm end, i.e., that portion of the dendrimer arm farthest away from the core of the dendrimer, and the metal-containing unit can be located at the dendrimer arm end and, thus, at the periphery of the dendrimer.

Alternatively, the Group 4 metal-containing unit can be located at the dendrimer arm interior, i.e., at a position intermediate between the dendrimer core and the dendrimer periphery.

The Group 4 metal-containing unit can be a metallocene unit such as a bis(cyclopentadienyl) complex metallocene unit or substituent having the formula

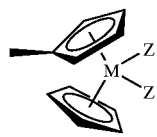

wherein Z is a chalcogen, halide, alkyl, aryl, amide, alkenyl or alkynyl substituent, M is the Group 4 metal and ― denotes a bond connecting the metallocene unit to the dendrimer arm.

The chalcogen substituent can be an $O_2CR$, OR, $O_3SCF_3$, or SR group wherein R is an organic substituent such as alkyl, polyfluoroalkyl, alkenyl, or aryl. The halide substituent can be a F, Cl, Br or I ion or mixtures thereof.

The metallocene unit can also be of the formula

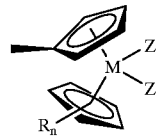

further including an R substituent wherein the number of such substituents, n, is an integer in the range of from about 1 to about 5 and R is an alkyl group such as a methyl group or an aryl group such as a phenyl or benzyl group. As used herein in the specification and claims, Me represents a methyl group and Ph represents a phenyl group.

Alternatively, the metallocene unit can be characterized by the formula

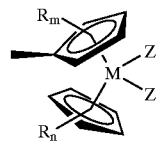

which further includes an R substituent where m, the number of such substituents, is an integer in the range of from about 1 to about 4 and R is an alkyl group such as a methyl group or an aryl group such as a phenyl or benzyl group.

The metallocene unit can also include a bridging group represented by

and have the formula

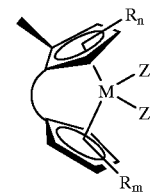

where R is an alkyl or aryl group, n=0–3 and m=0–4. The bridging group can be an organic bridge group such as $CH_2$, $CH_2CH_2$, $CH_2CH_2CH_2$, $CMe_2$, or $Me_2CCMe_2$, CH=CH, and the like. The bridging group can also be an organosilicon bridge such as $SiMe_2$, $SiMe_2CH_2SiMe_2$, $SiMe_2CH_2CH_2SiMe_2$, $Me_2SiSiMe_2$, or $Me_2SiOSiMe_2$ and the like.

The metallocene unit can also further include a functional group represented by and have the formula

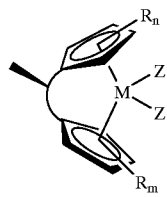

wherein

is a group bonded to the dendrimer such as MeSiCH$_2$CH$_2$SiMe$_2$, MeSiCH$_2$SiMe$_2$, MeSi, PhSi, MeSiSiMe$_2$, MeSiOSiMe$_2$ and the like, R is an alkyl or aryl group, m=0–4 and n=0–4.

The metallocene unit can also be characterized by the formula

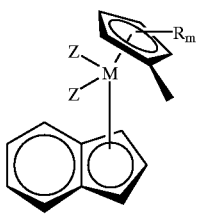

The organosilicon dendrimer of the present invention can include a monocyclopentadienyl unit metallocene unit having the formula

wherein Z is a group such as a chalcogen, halide, alkyl, aryl or amide substituent, M is the Group 4 metal, and

— denotes a bond connecting the metallocene unit to the dendrimer arm and R is a group such as methyl, alkyl, or aryl and n is an integer from 0 to about 4.

The dendrimer of the present invention can include a metallocene unit characterized by the formula

wherein Z is a chalcogen, halide, alkyl, aryl, or amide substituent, M is the Group 4 metal, and

— denotes a bond connecting the metallocene unit to the dendrimer arm.

The metallocene unit also can be characterized by the formula

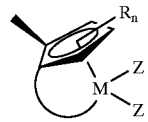

wherein Z is a chalcogen, halide, alkyl, aryl, or amide substituent, M is the Group 4 metal

— denotes a bond connecting the metallocene unit to the dendrimer arm, and

represents a

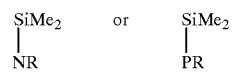

group wherein R is a group such as methyl, isopropyl, t-butyl, alkyl, phenyl, or aryl and n=0–3.

The metallocene unit can have the formula

wherein Z is a chalcogen, halide, alkyl, aryl, or amide substituent, M is the Group 4 metal,

— denotes a bond connecting the metallocene unit to the dendrimer arm represents a

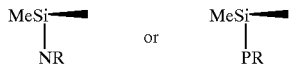

group wherein R is a group such as methyl, isopropyl, t-butyl, alkyl, phenyl, or aryl.

Alternatively, the metallocene unit can be further characterized by the formula

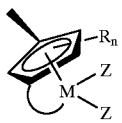

wherein Z can be a chalcogen, halide, alkyl, aryl, or amide substituent, M is a Group 4 metal,

— denotes a bond connecting the metallocene unit to the dendrimer arm, ( represents a group such as

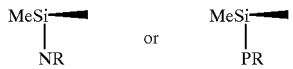

groups, R is a methyl, isopropyl, t-butyl, alkyl, or aryl group, and n is an integer in the range of from about 0 to about 3.

The foregoing dendrimers can be chemically attached to a solid support phase such as a refractory oxide like alumina, silica or zirconia, or an insoluble polymer like cross-linked polystyrene. The solid support phase can be selected depending upon the dendrimer catalytic properties desired.

Several processes exist to prepare an organosilicon, such as a carbosilane, dendrimer intermediate of a desired generation number, $G_n$, to which the metal-containing, such as a metallocene, substituent can then be attached. In a preferred embodiment, the carbosilane dendrimer growth chemistry is based upon a repetitive hydrosilylation/alkenylation sequence as described in Seyferth et al., Organometallics, 13 (1994) 2682–2690 where the dendrimer was grown out to the fourth generation.

Silicon hydrides appropriate for use in the hydrosilylation reaction include, but are not limited to, $HSiCl_3$, $CH_3SiHCl_2$, $(CH_3)_2SiHCl$, $ClCH_2(CH_3)SiHCl$, $PhSiHCl_2$, $HSi(OR)_3$, $CH_3SiH(OR)_2$, $(CH_3)_2SiH(OR)$, or $PhSiH(OR)_2$, wherein R is a methyl or higher alkyl group. The hydrosilylations can be catalyzed by platinum-based catalysts such as $H_2PtCl_6\cdot 6H_2O$, the Karstedt catalyst and other homogeneous Pt catalysts, as well as heterogeneous catalysts such as Pt on charcoal or asbestos.

Other transition metal catalysts can be used, as can free radical initiators such as organic peroxides and azo compounds. The reagents used in the alkenylation step can include, but are not limited to, Grignard reagents such as $CH_2$=$CHMgBr$; or $CH_2$=$CH(CH_2)_nMgCl_s$, n=1–11; organolithium reagents such as $CH_2$=$CHLi$; or $CH_2$=$CH(CH_2)_nLi$, n=1–11. Alkynyl-metal reagents such as $HC$≡$CNa$; $HC$≡$CMgBr$; or $HC$≡$C(CH_2)_nMgBr$, n=1–11 can also be used. Use of alkynyl-metal reagents for the hydrosilylation results in an alkenylene bridge rather than an alkylene bridge between the silicon atoms.

The carbosilane dendrimer prepared according to the foregoing method is then reacted with an appropriate Group 4 metallocene-containing reagent to form a carbosilane dendrimer having arms terminating in Group 4 metallocene substituents. The $G_n$ generation carbosilane dendrimer to be reacted with the Group 4 metallocene-containing reagent by a catalyzed hydrosilylation reaction can include a dendrimer arm end that terminates in a Si—H group. The Si—H containing group can be a —$SiMe_2H$, —$SiMeClH$, —$SiMeH_2$, —$SiCl_2H$, —$SiPhClH$, or $SiPhH_2$ group. The Group 4 metallocene substituent-containing reagent to be reacted with the foregoing $G_n$ generation carbosilane dendrimer can contain an unsaturated organic functional group wherein carbon is multiply bonded, such as C=C, C≡C, C=N, or C=O, that can be bonded to the metallocene reactant either directly or via other intervening atoms.

The metallocene-containing reagent can be chosen from among, but is not limited to, the reagents represented by the following formulas.

I

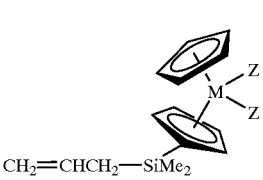

II

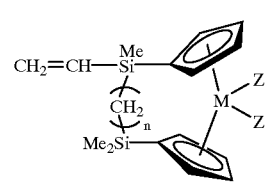

III

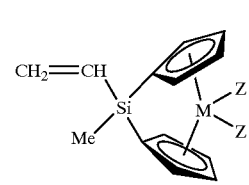

IV

-continued

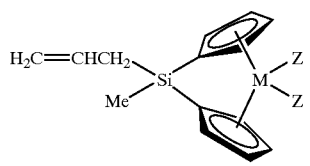
V

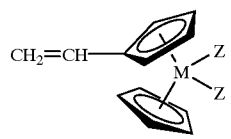
VI

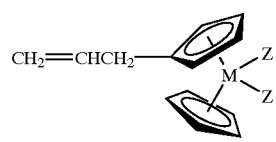
VII

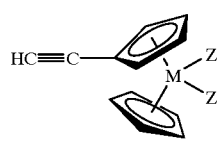
VIII

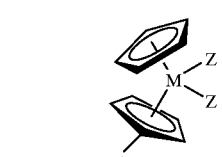
IX

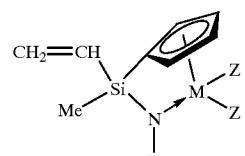
X

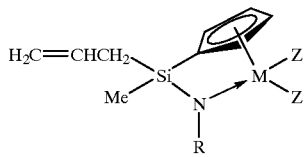
XI

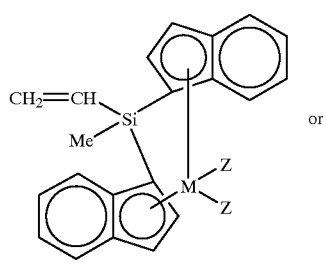
or

-continued

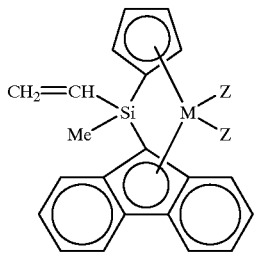

wherein Z can be a chalcogen, halide, alkyl, aryl, amide, alkenyl or alkynyl substituent, M is the Group 4 metal, R is a group such as methyl, alkyl, phenyl, or aryl, and → represents an electron pair donor bond. Z can be a halide such as F, Cl, Br or I, a chalcogen such as O, OR, S, SR, or an amide such as $NR_2$ where R is as already described. Typically, the dihalide is used. Each formula is identified by a Roman numeral which will be used for reference elsewhere in the specification. The metallocene substituent-containing reagent can include a metallocene substituent such as those given by the following formulas

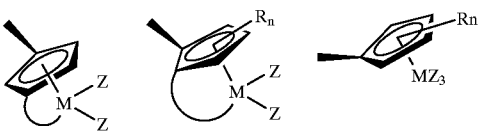

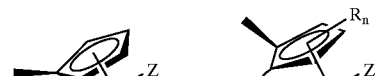

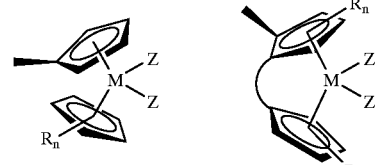

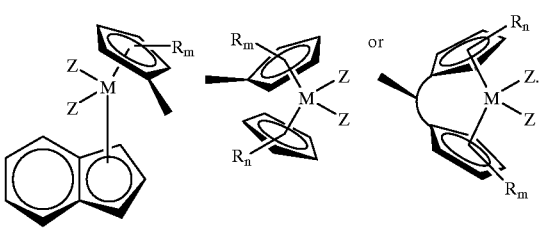

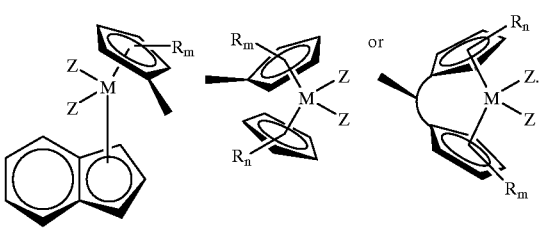

Alternatively, the $G_n$ generation organosilicon dendrimer arm end can terminate in a dendrimer unsaturated organic functional group and the Si—H containing functional group can be on the metal-containing reagent. The unsaturated organic functional group can be a group such as $CH_2=CH$, $CH_2=CH(CH_2)_n$, $CH_2=CHC_6H_4$, $HC\equiv C$, or $HC\equiv C(CH_2)_n$, where n=1–11 The metal-containing reagent Si-H group can then be reacted with the dendrimer unsaturated organic functional group by a catalyzed hydrosilylation reaction. Metallocene substituent-containing reagents can be given by formulas XII, XIII, XIV, and the like.

XII

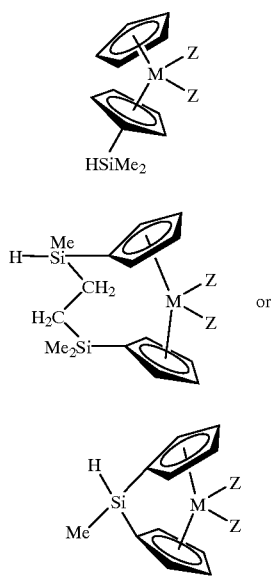

XIII

XIV wherein Z is a chalcogen, halide, alkyl, aryl, or amide substituent, and M is the Group 4 metal.

The metallocene reagent can also be

XV

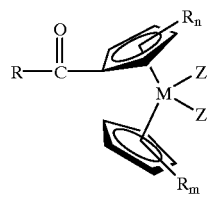

wherein Z is a chalcogen, halide, alkyl, aryl, or amide substituent, M is the Group 4 metal, R is a group such as alkyl, or aryl, n=0–4, and m=0–5. Here, the metallocene is connected to the dendrimer arms by carbonyl group hydrosilylation and the linkage is through an Si—O bond via Si—H addition to the C=O bond.

A Group 4 metal-containing group, such as a metallocene substituent, can be introduced at an internal site or sites in the dendrimer. As used herein in the specification and claims, an "internal site" is a position on a dendrimer arm intermediate between the dendrimer core and the end of the dendrimer arm or dendrimer periphery. The Group 4 metal-containing group can be introduced at an internal site by introducing a reactive functionality at a dendrimer internal site and reacting the reactive functionality with the Group 4 metal-containing reagent so that the Group 4 metal is introduced at the dendrimer internal site.

For example, internal site metallocene substituent introduction can be accomplished using a silicon hydride that contains a cleavable substituent, e.g., PhSiHCl$_2$, wherein the Ph—Si bond is easily cleaved, in step (b) of the method for synthesizing the dendrimer followed by; (1) building the dendrimer out to a selected G. generation; (2) terminating the dendrimer arm or arms with an unreactive functionality, e.g., SiMe$_3$; (3) cleaving the Si-Ph bond or bonds with HX (X=Br or O$_3$SCF$_3$) and reacting the resulting product with LiAlH$_4$ (Si—Ph→Si—X→Si—H sequence); and, finally, (3) reacting the Si—H product with a CH$_2$=CH containing metallocene, as given, e.g., by formulas I, II, IV, V, VI, VII, VIII, IX, or X. Step (2) can be performed at the G$_2$, i.e., the second generation stage of dendrimer building according to step (1).

Several representative, but not limiting, reactions for preparation of a Group 4 metal-containing carbosilane dendrimer from a G$_n$ generation carbosilane dendrimer and a metallocene substituent-containing reagent are as follows. For simplicity, only one arm of the multiple-armed dendrimer is shown in detail and the rest of the dendrimer is represented by

The Roman numerals refer generally to a metallocene reagent containing the metallocene substituent identified by the same Roman numeral as already given in the specification of this patent application.

XVI

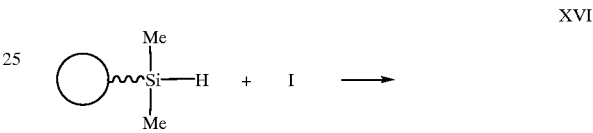

XVII

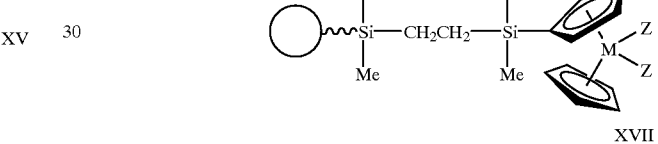

XVIII

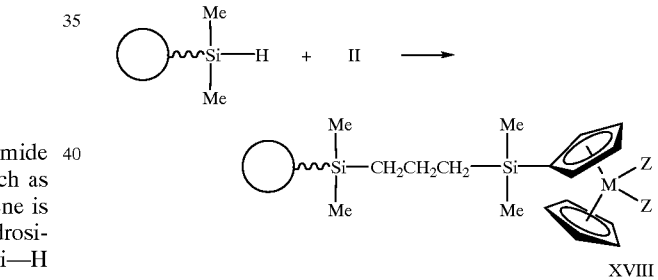

XIX

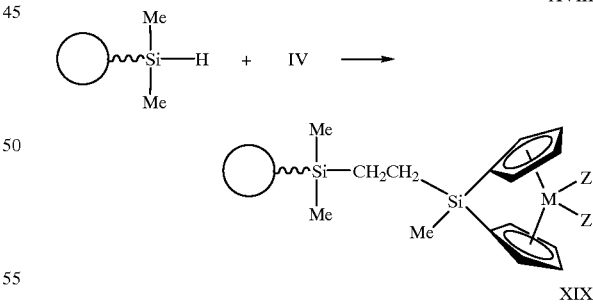

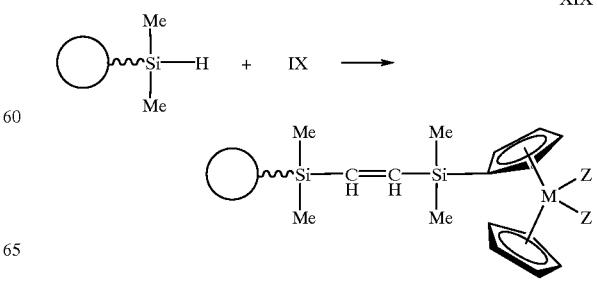

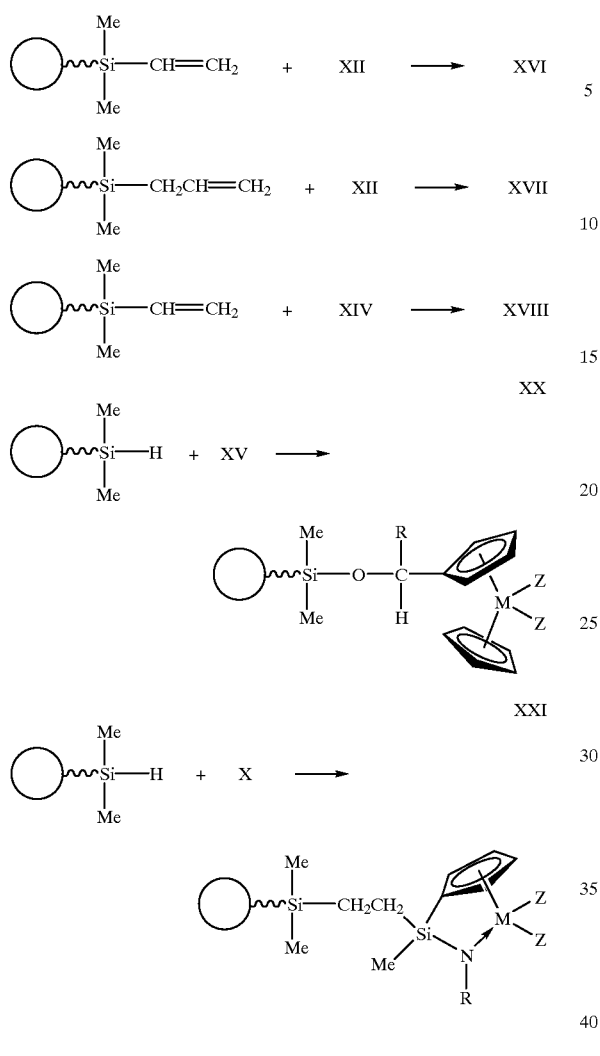

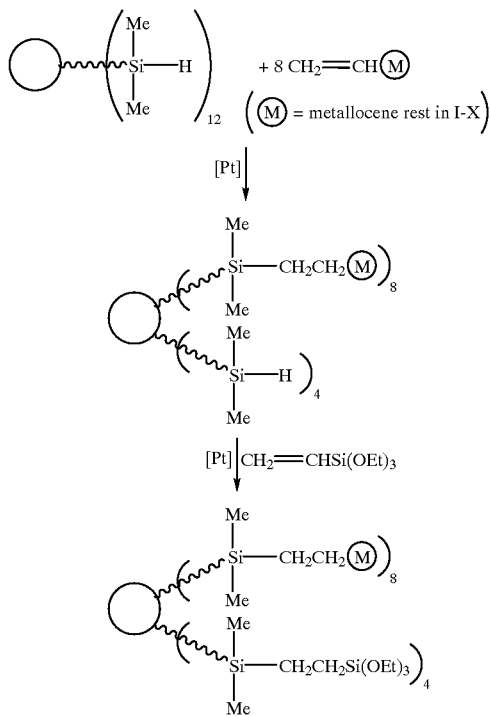

The dendrimers of the present invention can be anchored to a solid phase refractory oxide, such as alumina, silica, zirconia and the like, or to an insoluble polymer such as cross-linked polystyrene. Such anchored dendrimers can be used as anchored homogeneous catalysts.

The anchored dendrimers can be prepared by growing dendrimers from core molecules to a desired generation, $G_n$, and with some number, m, $SiMe_2H$ termini at the dendrimer periphery, according to the methods already described. However, in the final step of metal-containing reagent (such as a metallocene) addition, an insufficient amount of metallocene reagent, such as a $CH_2=CH$-containing metallocene as given by formulas I–X, is reacted with the $SiMe_2H$ terminated $G_n$ dendrimer. For example, using a twelve-armed $G_n$ dendrimer, only eight of the twelve arms can be reacted with the $CH_2=CH$-containing metallocene, thus leaving four $SiMe_2H$ terminated arms remaining. Sufficient $CH_2=CHSi(OEt)_3$ can then be added in the presence of a platinum catalyst to react with the remaining dendrimer $SiMe_2H$ terminated arms. Such a possible reaction sequence is shown schematically below.

In general, anchored dendrimers include an end group that attaches chemically to the solid phase support and the end group is selected based on the surface chemistry of the solid phase support.

Figure 3:
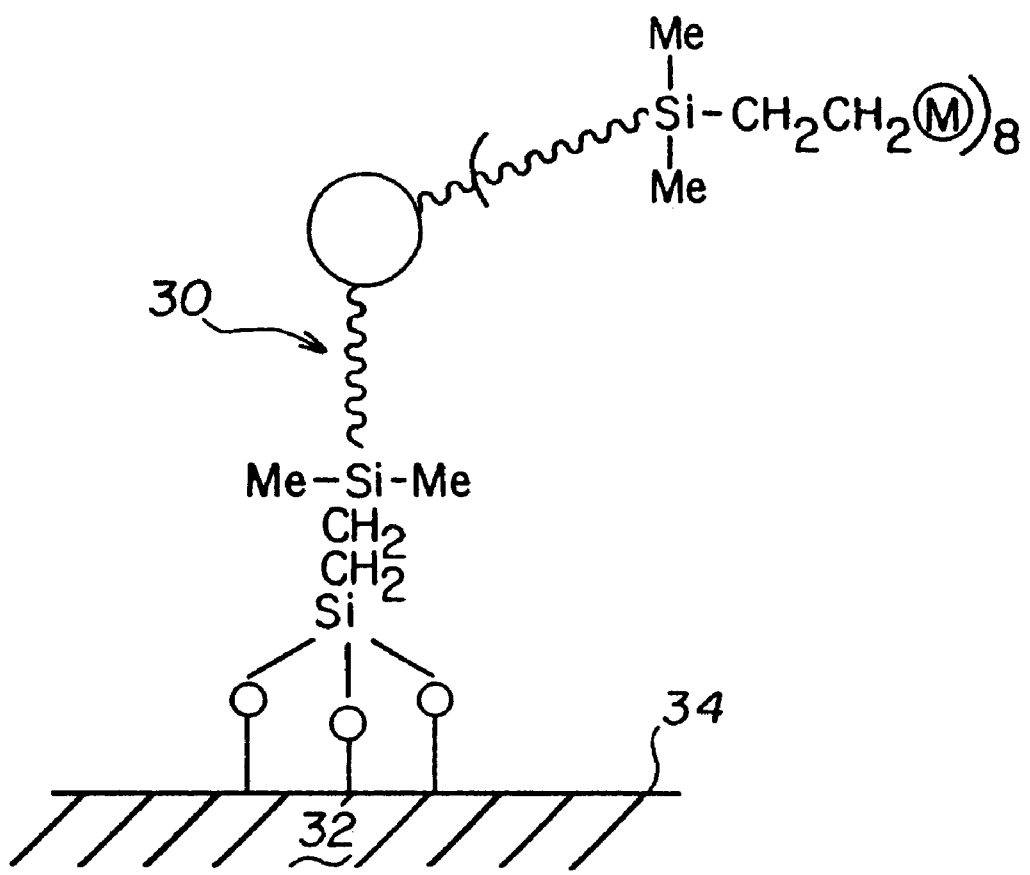
FIG. 3 is a schematic illustration of an anchored dendrimer of the invention showing anchored dendrimer 30 immobilized on solid phase alumina support 32 at support surface 34.

The $Si(OEt)_3$ functionalities bind to hydroxyl-containing surfaces, such as, for example, those of alumina and silica, to produce an immobilized, i.e., anchored dendrimer. FIG. 3 is a schematic illustration of anchored dendrimer 30 immobilized on solid phase alumina support 32 at support surface 34. Such supported dendrimer catalysts can be used to catalyze the gas phase polymerization of olefins.

Allyltriethoxysilane can be used in place of the vinyltriethoxysilane already described to yield an anchoring dendrimer arm

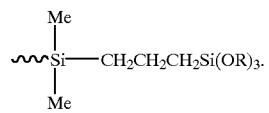

where R is an alkyl, methyl or ethyl group.

The Group 4 metal-containing organosilicon dendrimers of the present invention can be used in olefin polymerization or copolymerization methods wherein one or more olefin monomers are contacted with the organosilicon dendrimer catalyst in solution or in gas phase so that the olefin monomers are polymerized or copolymerized to form a polyolefin.

The monomers can be ethylene and a co-catalyst such as methylalumoxane (MAO), $B(C_6F_5)_3$, a $Ph_3C^+$ salt of the $(C_6F_5)_4B^-$ anion, or an organic ammonium salt of the $(C_6F_5)_4B^-$ anion can be provided. Other salts of anions of very low nucleophilicity also can be used.

The monomers can be α-olefins, such as propylene, 1-butene, styrene, and higher α-olefins, cyclic olefins such as cyclopentene, or norbornene, 1,3-dienes such as 1,3-butadiene or isoprene, and a co-catalyst such as methylalumoxane (MAO), $B(C_6F_5)_3$, a $Ph_3C^+$ salt of the $(C_6F_5)_4B^-$ anion, or an organic ammonium salt of the $(C_6F_5)_4B^-$ anion can be provided.

The Group 4 metal-containing organosilicon dendrimers of the present invention can also be used as catalysts for dehydrogenative condensation of silane monomers to form a polysilane as shown in the equation below.

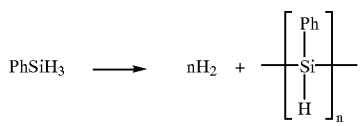

The homo- and copolymerizations can be completed at a temperature between −60° C. and 120° C., preferably between −10° C. and 60° C. using aliphatic or cycloaliphatic hydrocarbon solvents such as hexane or cyclohexane. More preferably, an aromatic hydrocarbon solvent such as toluene is used. Additionally, the polymerization can be done in the gas phase.

The metallocene concentration is in the range of $10^{-3}$ to $10^{-8}$ mol/ml solvent, preferably in the range of $10^{-4}$ to $10^{-6}$ mol/ml solvent. The cocatalyst concentration is in the range of $10^{-3}$ to $10^{-1}$ mol/ml, preferably in the range of $10^{-2}$ to $10^{-1}$ mol/ml.

The desired reactions can be carried out in solution suspension, or bulk, using pressures in the range of 0.1 bar to 50 bar, or preferably between 0.5 bar to 10 bar, whereby the homopolymerizations of cyclic olefins are done under normal pressure.

In order further to illustrate the present invention, the following examples are provided. The particular compounds, processes and conditions utilized in the examples are meant to be illustrative of the present invention and are not limited thereto.

EXAMPLES

The following Examples 1–27 are provided to show how metallocene complexes and Group 4 metal-containing carbosilane dendrimers were prepared, characterized, and used as polymerization catalysts.

In the examples that follow, the general dendrimer synthesis procedure as described in Seyferth et al., Organometallics, 13 (1994) 2682–2690 was followed. Typically, the core molecule was tetravinylsilane, $(CH_2=CH)_4Si$ and successive dendrimer generations were built up from this core molecule by successive platinum-catalyzed hydrosilylations of all Si—CH=$CH_2$ functions with $HSiCl_3$ or $CH_3SiHCl_2$ and vinylation of the Si—Cl functions thus introduced with vinylmagnesium bromide, $CH_2=CHMgBr$, in tetrahydrofuran (THF). The manner according to which the final hydrosilylation was accomplished was selected according to whether a Si-H function or an unsaturated organic function was the desired terminus for the arms of the dendrimer to be reacted with the metallocene reagent. To obtain a Si—H terminus, the final hydrosilylation was effected with $Me_2SiHCl$ and the terminal Si—Cl bonds were then reduced with $LiAlH_4$. To obtain a Si—CH=$CH_2$ or Si—$CH_2CH$=$CH_2$ terminus, the final hydrosilylation was effected with $Me_2SiHCl$ and the terminal Si—Cl bonds were vinylated with $CH_2=CHMgBr$ or $CH_2=CHCH_2MgCl$.

All reactions were carried out under an inert atmosphere, either nitrogen or argon. Solvents were purified before use according to methods well known to one skilled in the art.

The Karstedt catalyst (a solution of 1,3-divinyltetramethyldisiloxane-platinum complex in xylene, 2–3% Pt concentration) was purchased from Aldrich Chemical Co, Milwaukee, Wis.

Materials used to filter solutions include Florisil™, an activated magnesium silicate purchased from Aldrich Chemical Co., and Celite™ (Celite 545™),a diatomaceous earth purchased from Fisher Scientific Co.

The following Examples 1–8 describe preparation of titanocene, zirconocene and hafnocene complexes.

Example 1

Preparation of $Me_2(CH_2=CH)SiC_5H_4(C_5H_5)TiCl_2$

A 250 mL Schlenk flask equipped with a magnetic stirbar, a reflux condenser and a rubber septum was charged with 60 mL of THF and 3.30 g (22 mmol) of $Me_2(CH_2=CH)SiC_5H_5$. To this solution was added at −40° C., slowly by syringe, 13.74 mL of a 1.6 M solution of n-BuLi (22 mmol) in hexane. After it had been stirred at room temperature for 20 minutes, the resulting solution of $Me_2(CH_2=CH)SiC_5H_4Li$ was cooled to −10° C. and 4.82 g (22 mmol) of $C_5H_5TiCl_3$ in 30 mL of THF was added slowly. The reaction mixture was stirred at room temperature for 12 h and at reflux for another 2 h. Subsequently, the volatiles were removed at reduced pressure and the residue was dissolved in a mixture of 30 mL of toluene and 15 mL of $CH_2Cl_2$. The solution was filtered through Celite™. The product crystallized when the filtrate was stored at −30° C. for 12 h. The product was isolated as purple crystals, washed with two 5 mL portions of hexane and dried in vacuum; yield, 5.86 g (80%); melting point 145–146° C. Anal. Calcd. for $C_{14}H_{18}Cl_2SiTi$:C, 50.47; H, 5.44. Found: C, 51.05; H, 5.54. The $^1H$, $^{13}C$ and $^{29}Si$ NMR spectra were in agreement with the indicated structure.

Example 2

Preparation of $Me_2HSiC_5H_4(C_5H_5)TiCl_2$

The same procedure as already described in Example 1 was used to react 2.83 g (22.8 mmol) of $Me_2HSiC_5H_5$ in 50 mL of THF and an equimolar amount of n-BuLi in hexane to generate the lithium cyclopentadienide reagent. The lithium cyclopentadienide reagent was then reacted with 5.0 g (22.8 mmol) of $C_5H_5TiCl_3$. Once the reaction was complete, the solvents were removed at reduced pressure and the residue was taken up in benzene and filtered through Celite™. The residue obtained on removal of the benzene was recrystallized from hexane/toluene.

Example 3

Preparation of $Me_2(CH_2=CH)SiC_5H_4(C_5Me_5)ZrCl_2$

Substantially the same procedure as described in foregoing Example 1 was used to react 6.65 mmol of $Me_2(CH_2=CH)SiC_5H_4Li$ from 6.65 mmol each of n-BuLi and $Me_2(CH_2=CH)SiC_5H_5$ and 2.2 g (6.65 mmol) of $C_5Me_5ZrCl_3$ in 30 mL of THF. After the volatiles were removed at reduced pressure, the residue was taken up in 30 mL of toluene. The toluene solution was filtered through Celite™ and then evaporated in vacuum. The solid residue was washed with two 5 mL portions of cold hexane and recrystallized from hexane, giving 1.61 g (54%) of white crystals, melting point 121–122° C. Anal. Calcd. for $C_{19}H_{28}Cl_2SiZr$: C, 51.08; H, 6.32. Found: C, 51.24; H. 6.41. The $^1H$, $^{13}C$ and $^{29}Si$ NMR spectra of the product were in agreement with the indicated structure.

Example 4
Preparation of $Me_2(CH_2=CH)SiC_5H_4(C_5H_5)ZrCl_2$

The apparatus already described in the foregoing Example 1 was charged with 10.0 g of $ZrCl_4$ and 90 mL of $CH_2Cl_2$ to form a solution to which was added slowly at 0° C. by syringe 6.4 mL (43 mmol) of dimethyl sulfide. The resulting solution was stirred for 30 min and then 5.94 g (43 mmol) of $Me_3SiC_5H_5$ was added slowly. After the mixture was stirred at room temperature for 1 h, the volatiles were removed at reduced pressure and the residue was dissolved in 60 mL of THF. To this solution 6.70 g (43 mmol) of $Me_2(CH_2=CH)SiC_5H_4Li$ in 50 mL of THF at −20° C. was added. The reaction mixture was stirred at room temperature for 12 h and for another 2 h at 50° C., then was concentrated to 20 mL. Toluene (40 mL) was added and the solution was filtered through Celite™. After removal of most of the solvents at reduced pressure, 50 mL of hexane was added. The resulting crystalline residue was washed with 5 mL of cold hexane and recrystallized from hexane to give 9.4 g (58%) of white crystals, melting point 116–117° C. Anal. Calcd. for $C_{14}H_{18}Cl_2SiZr$: C, 44.86; H, 4.82. Found: C, 43.74; H 4.91. The $^1H$, $^{13}C$ and $^{29}Si$ NMR spectra were in agreement with the indicated structure.

Example 5
Preparation of $(\mu\text{-}Me(CH_2=CH)Si)(C_5H_4)_2ZrCl_2$

The same apparatus as already described in Example 1 was charged with 5.0 g (25.0 mmol) of $Me(CH_2=CH)Si(C_5H_5)_2$ and 60 mL of THF to form a solution. This solution was cooled to −40° C. and 19.9 mL of 2.5 M n-BuLi (49.8 mmol) in hexane was added slowly by syringe. The resulting mixture was stirred for 1 h at room temperature, then cooled to −10° C. and 5.81 g (24.9 mmol) of $ZrCl_4$ was added. The reaction mixture was stirred for 48 h at room temperature. Subsequently, the THF was removed at reduced pressure, and the residue was taken up in 100 mL of $CH_2Cl_2$. This solution was filtered through Celite™. The filtrate was concentrated to 40 mL and stored at −30° C. for 12 h. The crystalline solid that formed was washed with two 5 mL portions of cold $CH_2Cl_2$ and dried in vacuo. The yield was 3.3. g (37%) and the melting point was 239–240° C. Anal. Calcd. for $C_{13}H_{14}Cl_2SiZr$: C, 43.32; H, 3.91. Found: C, 43.14; H 3.97. $^1H$ NMR ($CDCl_3$): δ 0.78 (s, 3H, $SiCH_3$), 6.0 (m, 4H, $C_5H_4$), 6.26–6.54 (m, 3H, $CH_2=CH$), 6.92–6.99 (m, 4H, $C_5H_4$). $^{13}C$ {$^1H$} NMR ($CDCl_3$): $\delta_c$ −6.30 ($SiCH_3$), 107.89 ($C_5H_4$), 114.29 ($C_5H_4$), 115.12 ($C_5H_4$), 127.68 ($C_5H_4$), 129.51 ($C_5H_4$), 130.19 ($\underline{C}H_2=CH$), 138.45 ($CH_2=\underline{C}H$). For NMR measurements, Si atoms are numbered from the dendrimer core to the dendrimer periphery and that number indicated by a superscript to the right of its chemical symbol.

Example 6
Preparation of $(Me_2HSiC_5H_4)(Me_3SiC_5H_4)TiCl_2$

Using the same apparatus as described in the foregoing Example 1, 5.3 mL of a solution of 2.5 M n-BuLi in hexane (13.33 mmol) was added to a solution of 1.66 g (13.33 mmol) of $Me_2HSiC_5H_5$ in 30 mL of THF. The mixture was stirred at room temperature for 20 min. Subsequently, a solution of 3.88 g (13.33 mmol) of $Me_3SiC_5H_4TiCl_3$ in 20 mL of THF was added slowly at −20° C. The resulting red reaction mixture was stirred for 12 h at room temperature. Removal of THF at reduced pressure was followed by solution of the residue in benzene and filtration through Celite™. Evaporation of the filtrate left a red solid that was recrystallized from hexane/toluene to give orange crystals (2.8 g, 55%). Anal. Calcd. for $C_{15}H_{24}Cl_2Si_2Ti$: C, 47.50; H, 6.38. Found: C, 47.56; H, 6.55. $^1H$ NMR ($C_6D_6$): δ 0.25–0.40 (m, 15H, $SiCH_3$), 4.48–4.65 (m, 1H, SiH), 5.85–6.02 (m, 4H, $C_5H_4$), 6.38–6.52 (m, 4H, $C_5H_4$). For the NMR analysis, Si atoms are numbered from the core outward toward the periphery of the dendrimer and that number indicated by a superscript to the right of its chemical symbol.

Example 7
Preparation of $(Me_2(CH_2=CH)SiC_5H_4)(C_5H_5)HfCl_2$

A 250 mL Schlenk flask equipped with a magnetic stir bar and a rubber septum was charged with 50 mL of $CH_2Cl_2$ and 8.0 g (25.0 mmol) of $HfCl_4$. To this solution, 3.7 mL (50.0 mmol) of $SMe_2$ was added slowly by syringe at 0° C. After further stirring for 30 min, 8.88 g (25.0 mmol) of $(n\text{-}C_4H_9)_3SnC_5H_5$ was slowly added. The resulting mixture was stirred for 12 h at room temperature. The solution was concentrated to 20 mL and 30 mL of n-hexane was added. The remaining solid was filtered and washed twice with 20 mL of n-hexane. Then, the solid was dissolved in 80 mL of THF. After removing the THF at reduced pressure, 8.7 g (17.6 mmol) of $C_5H_5HfCl_3(THF)_2$ remained. 8.5 g (17.2 mmol) of $C_5H_5HfCl_3(THF)_2$ was dissolved in 60 mL of THF. A solution of 17.2 mmol of $LiC_5H_4SiMe_2Vi$, where "Vi" indicates a vinyl functional group, in 50 mL of THF was added at −20° C. The resulting mixture was stirred for 15 h at room temperature. All volatiles were removed at reduced pressure at room temperature. The residue was dissolved in 80 mL of toluene and filtered through Celite™. The solution was concentrated to 25 mL and kept for 12 h at −30° C. The crystals obtained were filtered at −10° C. and washed with 10 mL of cold toluene. The resulting white crystals were dried in vacuum. A yield of 3.83 g (48.0%) with melting point 108–110° C. was obtained. Anal. Calcd. for $C_{14}H_{18}Cl_2HfSi$: C, 36.26; H, 3.91. Found: C, 34.85; H, 3.99.

$^1H$ NMR ($CDCl_3$): δ 0.360 (s, 6H, $SiCH_3$), 5.700–6.320 (m, 3H, $CH_2=CH$), 6.337 (m, 5H, $C_5H_5$), 6.443 (m, 2H, $C_5H_4$), 6.621 (m, 2H, $C_5H_4$).

$^{13}C$ {$^1H$} NMR ($CDCl_3$):δ −2.03 (s, $SiCH_3$), 114.66 (s, $C_5H_5$), 116.52 (s, $C_5H_4$), 121.30 (s, $C_5H_4$), 124.25 (s, $C_5H_4$), 133.02 (s, $\underline{C}H_2=CH$), 137.97 (s, $CH_2=\underline{C}H$)

$^{29}Si$ {$^1H$} NMR ($CDCl_3$): $\delta_{Si}$ −14.6 (s, $Si(CH_4)$). For the NMR analysis, Si atoms are numbered from the core outward toward the periphery of the dendrimer and that number indicated by a superscript to the right of its chemical symbol.

Example 8
Preparation of $(Me_2(CH_2=CHCH_2)SiC_5H_4)(C_5H_4)TiCl_2$

A 250 mL Schlenk flask equipped with a magnetic stir bar and a rubber septum was charged with 100 mL of THF and 5.87 g (35.7 mmol) of $Me_2(CH_2=CHCH_2)SiC_5H_5$. To this solution was added at −40° C., slowly by syringe, 14.3 mL of a 2.5 M solution of n-BuLi (35.7 mmol) in hexane. After it had been stirred at room temperature for 20 minutes, the resulting solution of $Me_2(CH_2=CHCH_2)SiC_5H_4Li$ was cooled to −10° C. and 7.84 g (35.7 mmol) of $C_5H_5TiCl_3$ in 60 mL of THF was added slowly. The reaction mixture was stirred at room temperature for 12 h. Subsequently, the volatiles were removed at reduced pressure and the residue was dissolved in 50 mL of $CH_2Cl_2$. The solution was filtered through Celite™ and the $CH_2Cl_2$ was removed at reduced pressure. The crystallized product was washed with 30 mL of hexane. The orange crystals were collected and dried in vacuum. A yield of 11.6 g (93.5%) with melting point 148–149° C. was obtained. The $^1H$, $^{13}C$ and $^{29}Si$ NMR spectra were in agreement with the indicated structure.

The following Examples 9–20 describe the synthesis of dendrimers with Group 4 metallocene termini.

Example 9
Preparation of Si[CH$_2$CH$_2$SiMe$_2$CH$_2$CH$_2$SiMe$_2$C$_5$H$_4$(C$_5$Me$_5$)ZrCl$_2$]$_4$ A 20 mL Schlenk flask was charged with 0.4024 g (0.9 mmol) of Me$_2$(CH$_2$=CH)SiC$_5$H$_4$(C$_5$Me$_5$)ZrCl$_2$, 0.847 g (0.225 mmol) of Si(CH$_2$CH$_2$SiMe$_2$H)$_4$, 1 mL of THF and 20 μL of the Karstedt catalyst solution. The reaction mixture was stirred at 50° C. for 12 h. Then, 2 mL of THF were added and the solution was filtered through Celite™. Volatiles were removed from the filtrate at reduced pressure, leaving a light yellow oil that was heated at 60° C. in high vacuum for several hours. A light yellow, waxy residue remained, 0.463 g (95%). Anal. Calcd. for C$_{92}$H$_{156}$Cl$_8$Si$_9$Zr$_4$: C, 51.07; H, 7.27. Found: C, 51.28; H, 7.46.

$^1$H NMR (CDCl$_3$): δ −0.103 (s, 6H, Si$^2$CH$_3$), 0.20–0.60 (m, 14H, Si$^3$CH$_3$, SiCH$_2$), 2.00 (s, 15H, C$_5$(CH$_3$)$_5$), 6.092 (m, 2H, C$_5$H$_4$), 6.432 (m, 2H, C$_5$H$_4$).

$^{13}$C {$^1$H} NMR (CDCl$_3$):δ −4.38 (Si$^2$CH$_3$), −2.83 (Si$^3$CH$_3$), 2.25 (Si$^1$CH$_2$CH$_2$Si$^2$), 6.49 (Si$^2$CH$_2$CH$_2$CH$_2$Si$^3$), 12.46 (C$_5$(CH$_3$)$_5$), 114.94 (C$_5$H$_4$), 124.13 (C$_5$(CH$_3$)$_5$), 125.28 (C$_5$H$_4$), 128.75 (C$_5$H$_4$).

$^{29}$Si {$^1$H} NMR (CDCl$_3$): δ$_{Si}$ −3.83 (Si$^3$), 5.21 (Si$^2$), 8.77 (Si$^1$).

For the NMR analysis, Si atoms are numbered from the core outward toward the periphery of the dendrimer and that number indicated by a superscript to the right of its chemical symbol.

Example 10
Preparation of Si[CH$_2$CH$_2$SiMe$_2$CH$_2$CH$_2$SiMe$_2$C$_5$H$_4$(C$_5$H$_5$)ZrCl$_2$]$_4$ The same procedure as already set forth in the foregoing Example 7 was used in the reaction of 0.5684 g (1.51 mmol) of Me$_2$(CH$_2$=CH)SiC$_5$H$_4$(C$_5$H$_4$)ZrCl$_2$ and 0.1423 g (0.377 mmol) of Si(CH$_2$CH$_2$SiMe$_2$H)$_4$ in 2 mL of THF in the presence of 30 μL of the Karstedt catalyst solution. The product (0.710 g, approximately 100%) was a white solid of melting point 135–136° C. Anal. Calcd. for C$_{72}$H$_{116}$Cl$_8$Si$_9$Zr$_4$: C, 45.93; H, 6.21. Found: C, 45.43; H, 6.39.

$^1$H NMR (CDCl$_3$): δ −0.094 (s, 6H, Si$^2$CH$_3$), 0.20–0.62 (m, 14H, Si$^3$CH$_3$, SiCH$_2$), 6.43 (s, 5H, C$_5$H$_5$), 6.52 (m, 2H, C$_5$H$_4$), 6.68 (m, 2H, C$_5$H$_4$).

$^{13}$C {$^1$H} NMR (CDCl$_3$):δ −4.34 (Si$^2$CH$_3$), −2.81 (Si$^3$CH$_3$), 2.51 (Si$^1$CH$_2$), 6.44 (Si$^2$CH$_2$CH$_2$Si$^3$), 6.59 (Si$^1$CH$_2$CH$_2$), 8.94 (Si$^2$CH$_2$CH$_2$Si$^3$), 115.84 (C$_5$H$_5$), 117.08 (C$_5$H$_4$), 125.21 (C$_5$H$_5$), 125.73 (C$_5$H$_5$).

$^{29}$Si {$^1$H} NMR (CDCl$_3$): δ −3.81 (Si$^3$), 5.34 (Si$^2$), 8.79 (Si$^1$).

For the NMR analysis, Si atoms are numbered from the core outward toward the periphery of the dendrimer and that number indicated by a superscript to the right of its chemical symbol.

Example 11
Preparation of Si[CH$_2$CH$_2$SiMe$_2$CH$_2$CH$_2$SiMe$_2$C$_5$H$_4$(C$_5$H$_5$)TiCl$_2$]$_4$ The same procedure as already described in the foregoing Example 7 was used in the reaction of 0.4987 g (0.0374 mmol) of Si(CH$_2$CH$_2$SiMe$_2$H)$_4$ in 2 mL of THF in the presence of 40 μL of the Karstedt catalyst solution. After the mixture had been stirred at 50° C. for 4 h, removal of volatiles at reduced pressure left a red solid of melting point 118–120° C.; 0.639 g (approximately 100%). Anal. Calcd. for C$_{72}$H$_{116}$Cl$_8$Si$_9$Ti$_4$: C, 50.58; H, 6.85. Found: C, 50.38; H, 6.82.

$^1$H NMR (CDCl$_3$): δ −0.095 (s, 6H, Si$^2$CH$_3$), 0.20–0.65 (m, 14H, Si$^3$CH$_3$, SiCH$_2$), 6.53 (s, 5H, C$_5$H$_5$), 6.605 (m, 2H, C$_5$H$_4$), 6.84 (m, 2H, C$_5$H$_4$).

$^{13}$C {$^1$H} NMR (CDCl$_3$):δ −4.34 (Si$^2$CH$_3$), −2.72 (Si$^3$CH$_3$), 2.62 (Si$^1$CH$_2$), 6.64 (Si$^2$CH$_2$CH$_2$Si$^3$), 6.70 (Si$^1$CH$_2$CCH$_2$), 8.96 (Si$^2$CH$_2$CH$_2$Si$^3$), 120.14 (C$_5$H$_5$), 121.14 (C$_5$H$_4$), 132.02 (C$_5$H$_4$).

$^{29}$Si {$^1$H} NMR (CDCl$_3$): δ$_{Si}$ −2.73(Si$^3$), 5.39 (Si$^2$), 8.84 (Si$^1$).

For the NMR analysis, Si atoms are numbered from the core outward toward the periphery of the dendrimer and that number indicated by a superscript to the right of its chemical symbol.

Example 12
Preparation of Si[CH$_2$CH$_2$SiMe{CH$_2$CH$_2$SiMe$_2$CH$_2$CH$_2$SiMe$_2$C$_5$H$_5$(C$_5$H$_5$)TiCl$_2$}$_2$]$_4$ The same procedure as already described in the foregoing Example 7 was used in the reaction of 1.084 g (3.254 mmol) of Me$_2$(CH$_2$=CH)SiC$_5$H$_4$(C$_5$H$_5$)TiCl$_2$ with 0.4109 g (0.407 mmol) of Si[CH$_2$CH$_2$SiMe{CH$_2$CH$_2$SiMe$_2$H}$_2$]$_4$ in 5 mL of THF in the presence of 80 μL of the Karstedt catalyst solution. After the reaction mixture had been stirred at 60° C. for 72 h, it was filtered through Celite™. Removal of volatiles at reduced pressure left a red solid of melting point 65–67° C.; 1.34 g (90%). Anal. Calcd. for C$_{156}$H$_{260}$Cl$_{16}$Si$_{21}$Ti$_8$: C, 50.97; H, 7.13. Found: C, 50.83; H, 7.38.

$^1$H NMR (CDCl$_3$): δ −0.100 (s, 12H, Si$^3$CH$_3$), 0.05–0.63 (m, 35H, Si$^2$CH$_3$, Si$^4$CH$_3$, SiCH$_2$), 6.54 (m, 10H, C$_5$H$_5$), 6.60 (m, 4H, C$_5$H$_4$), 6.84 (m, 4H, C$_5$H$_4$).

$^{13}$C {$^1$H} NMR (CDCl$_3$):δ$_c$ −6.36 (Si$^2$CH$_3$), −4.24 (Si$^3$CH$_3$), −2.61 (Si$^4$CH$_3$), 2.43 (Si$^1$CH$_2$), 4.52 (Si_CH$_2$CH$_2$Si_), 4.81 (Si$^1$CH$_2$CH$_2$Si$^2$), 6.67 (Si$^3$CH$_2$CH$_2$Si$^4$), 6.88 (Si$^2$CH$_2$CH$_2$Si$^3$), 9.01 (Si$^3$CH$_2$CH$_2$Si$^4$), 120.1 (C$_5$H$_5$), 121.24 (C$_5$H$_4$(C$_5$H$_4$)), 128.87 (C$_5$H$_4$), 131.97 (C$_5$H$_4$).

$^{29}$Si {$^1$H} NMR(CDCl$_3$): δ$_{Si}$ −2.73 (Si$^4$), 5.41 (Si$^3$), 7.44 (Si$^2$), 8.91 (Si$^1$). For the NMR analysis, Si atoms are numbered from the core outward toward the periphery of the dendrimer and that number indicated by a superscript to the right of its chemical symbol.

Example 13
Preparation of Si[CH$_2$CH$_2$SiMe$_2${CH$_2$CH$_2$SiMe$_2$CH$_2$CH$_2$SiMe$_2$C$_5$H$_4$(C$_5$H$_5$)ZrCl$_2$}$_2$]$_4$ The same procedure as already described in the foregoing Example 7 was used in the reaction of 0.6164g (1.637 mmol) of Me$_2$(CH$_2$=CH)SiC$_5$H$_4$(C$_5$H$_5$)ZrCl$_2$ with 0.2068 g (0.205 mmol) of Si [CH$_2$CH$_2$SiMe{CH$_2$CH$_2$SiMe$_2$H}$_2$]$_4$ in 1 mL of THF in the presence of 60 μL of the Karstedt catalyst solution. After the reaction mixture had been stirred at 50° C. for 12 h, removal of volatiles at reduced pressure left 0.823g (approximately 100%) of a light brown, waxy compound of melting point 70–72° C.

Anal. Calcd. for Cl$_{156}$H$_{260}$Cl$_{16}$Si$_{21}$Zr$_8$: C, 46.58; H, 6.51. Found: C, 46.00; H, 6.36.

$^1$H NMR (CDCl$_3$): δ−0.102 (s, 12H, Si$^3$CH$_3$), 0.08–0.63 (m, 35H, Si$^3$CH$_3$, Si$^4$CH$_3$, SiCH$_2$, SiCH$_2$), 6.44 (m, 10H, C$_5$H$_5$), 6.53 (m, 4H, C$_5$H$_4$), 6.68 (m, 2H, C$_5$H$_4$).

$^{13}$C {$^1$H} NMR (CDCl$_3$): δ$_c$ −6.53 (Si$^2$CH$_3$), −4.43 (Si$^3$CH$_3$), −2.88 (Si$^4$CH$_3$), 2.29 (Si$^1$CH$_2$), 4.29 (Si$^2$CH$_2$CH$_2$Si$^3$), 4.55 (Si$^1$CH$_2$CCH$_2$Si$^2$), 6.38 (Si$^3$CH$_2$CH$_2$Si$^3$), 6.63 (Si$^2$CH$_2$CH$_2$Si$^3$), 8.84 (Si$^3$CH$_2$CH$_2$Si$^4$), 115.77 (C$_5$H$_5$), 117.05 (C$_5$H$_4$), 125.14 (C$_5$H$_4$), 125.69 (C$_5$H$_4$).

$^{29}$Si {$^1$H} NMR (CDCl$_3$): δ$_{Si}$ −3.88 (Si$^4$), 5.30 (Si$^3$), 7.36 (Si$^2$), 9.02 (Si$^1$). For the NMR analysis, Si atoms are numbered from the core outward toward the periphery of the dendrimer and that number indicated by a superscript to the right of its chemical symbol.

Example 14
Preparation of $Si[CH_2CH_2SiMe_2CH_2CH_2SiMe(C_5H_4)_2ZrCl_2]_4$ A 50 mL Schlenk flask was charged with 1.11 g (3.09 mmol) of $(\mu\text{-Me}(CH_2\!\!=\!\!CH)Si)(C_5H_4)_2ZrCl_2$, 0.2911 g (0.77 mmol) of $Si(CH_2CH_2SiMe_2H)_4$ in 15 mL of THF and 80 μL of the Karstedt catalyst solution. After the reaction mixture was stirred at 60° C. for 24 h, removal of volatiles at reduced pressure left 1.4 g (approximately 100%) of a white solid (dried at 50° C. in vacuo) of melting point 86–88° C. Anal. Calcd. for $C_{68}H_{100}Cl_8Si_9Zr_4$: C, 44.90; H, 5.54. Found: C, 44.75; H, 5.67.

$^1H$ NMR (CDCl$_3$): δ 0.046 (s, 6H, CH$_3$Si$^2$), 0.25–0.90 (m, 7H, CH$_3$Si$^3$, Si$^1$CH$_2$CH$_2$Si$^2$), 1.02–1.35 (m, 4H, Si$^2$CH$_2$CH$_2$Si$^3$), 5.90–5.97 (m, 4H, C$_5$H$_4$), 6.94 (m, 4H, C$_5$H$_4$).

$^{13}C$ {$^1H$} NMR (CDCl$_3$):δ$_c$ −7.68 (Si$^3$CH$_3$), −4.34 (Si$^2$CH$_3$), 2.81, 3.36, 5.67, 6.94 (SiCH$_2$), 108.78 (C$_5$H$_4$), 113.90 (C$_5$H$_4$), 115.37 (C$_5$H$_4$), 127.98 (C$_5$H$_4$), 129.30 (C$_5$H$_4$). For the NMR analysis, Si atoms are numbered from the core outward toward the periphery of the dendrimer and that number indicated by a superscript to the right of its chemical symbol.

Example 15
Preparation of $Si[CH_2CH_2SiMe(CH_2CH_2SiMe_2CH_2CH_2SiMe(C_5H_4)_2ZrCl_2)_2]_4$ A 20 mL Schlenk flask was charged with 450 mg (1.25 mmol) of $(Me(CH_2\!\!=\!\!CH)Si(C_5H_4)_2)ZrCl_2$, 158 mg (0.16 mmol) of $Si(CH_2CH_2SiMe(CH_2CH_2SiMe_2H)_2)_4$ in 4 mL of THF and 80 μL of the Karstedt catalyst. The reaction mixture was stirred at 50° C. for 48 h, and all volatiles were removed at reduced pressure. The white solid that remained was dried in vacuum at 60° C. A yield of 0.60 g (approximately 100%) was obtained. Anal. Calcd. for $C_{148}H_{228}Cl_{16}Si_{21}Zr_8$: C, 45.65; H, 5.90. Found: C, 45.76; H, 6.15.

$^1H$ NMR (CDCl$_3$): δ −0.15–0.15 (sg, 15H, Si$^2$CH$_3$, Si$^3$CH$_3$), 0.25–0.90 (sg, 18H, Si$^4$CH$_3$, SiCH$_2$), 1.00–1.30 (m, 8H, Si$^3$(CH$_2$)$_2$Si$^4$), 5.95 (m, 8H, C$_5$H$_4$), 6.90 (m, 8H, C$_5$H$_4$).

$^{13}C$ {$^1H$} NMR (CDCl$_3$):δ$_c$ −7.78 (s, Si$^4$CH$_3$), −6.43 (s, Si$^2$CH$_3$) −4.37 (s, Si$^3$CH$_3$), 2.90, 3.18, 4.47, 5.47, 6.00, 6.74 (s, SiCH$_2$), 108.92 (sg, C$_5$H$_4$), 113.68 (m, C$_5$H$_4$), 115.07 (s, C$_5$H$_4$), 127.77 (s, C$_5$H$_4$), 128.86 (s, C$_5$H$_4$). For the NMR analysis, Si atoms are numbered from the core outward toward the periphery of the dendrimer and that number indicated by a superscript to the right of its chemical symbol.

Example 16
Preparation of $Si[CH_2CH_2SiMe_2CH_2CH_2SiMe_2(C_5H_4)(C_5H_5)HfCl_2]_4$ A 20 mL Schlenk flask was charged with 1.103 g (2.38 mmol) of 5-dimethylvinylsilylcyclopentadienyl (cyclopentadienyl)hafnium dichloride, 224 mg (0.59 mmol) of $Si(CH_2CH_2SiMe_2H)_4$, 2.5 mL of THF and 30 μL of the Karstedt catalyst. The reaction mixture was stirred at 50° C. for 12 h, and all volatiles were removed at reduced pressure. The residue was dissolved in 5 mL of toluene and filtered through Florisil™. After the toluene was removed, the remaining light brown, waxy compound was dried in vacuum at 50° C. and had melting point 73–76° C. and yield 1.21 g (91.2%). Anal. Calcd. for $C_{72}H_{116}Cl_8Si_9Hf_4$: C, 38.74; H, 5.24. Found: C, 38.83; H, 5.35.

$^1H$ NMR (CDCl$_3$): δ −0.087 (s, 6H, Si$^2$CH$_3$), 0.23–0.60 (m, 14H, Si$^3$CH$_3$, SiCH$_2$), 6.337 (s, 5H, C$_5$H), 6.436 (m, 2H, C$_5$H$_4$), 6.594 (m, 2H, C$_5$H$_4$).

$^{13}C$ {$^1H$} NMR (CDCl$_3$):δ$_c$ −4.37 (s, Si$^2$CH$_3$), −2.70 (s, Si$^3$CH$_3$), 2.66 (s, Si$^1$CH$_2$CH$_2$Si$^2$), 6.59 (s, Si$^2$CH$_2$CH$_2$Si$^3$), 6.74 (s, Si$^1$CH$_2$CH$_2$Si$^2$), 9.11 (s, Si$^2$CH$_2$CH$_2$Si$^3$), 114.53 (s, C$_5$H$_5$), 115.87 (s, C$_5$H$_4$), 123.20 (s, C$_5$H$_4$), 124.19 (s, C$_5$H$_4$).

$^{29}Si$ {$^1H$} NMR (CDCl$_3$): δ$_{Si}$ −4.26 (s, Si$^3$ (C$_5$H$_4$)), 5.00 (s, $\overline{Si}^2$CH$_2$CH$_2$Si$^3$), 8.60 (s, $\underline{Si}^1$CH$_2$CH$_2$Si$^2$)

For the NMR analysis, Si atoms are numbered from the core outward toward the periphery of the dendrimer and that number indicated by a superscript to the right of its chemical symbol.

Example 17
Preparation of $Si[CH_2CH_2Si(CH_2CH_2SiMe_2CH_2CH_2SiMe_2(C_5H_4)(C_5H_5)ZrCl_2)_3]_4$ A 20 mL Schlenk flask was charged with 773 mg (2.05 mmol) of 5-dimethylvinylsilylcyclopentadienyl (cyclopentadienyl)zirconium dichloride, 222 mg (0.17 mmol) of $Si(CH_2CH_2Si(CH_2CH_2SiMe_2H)_3)_4$, 3 mL of THF and 80 μL of the Karstedt catalyst. The reaction mixture was stirred at 50° C. for 4 h. Toluene (5 mL) was added to the reaction mixture and the resulting solution was then filtered through Celite™. All volatiles were removed at reduced pressure. A light brown oil remained and was dried at 50° C. in high vacuum with yield 0.90 g (90%). Anal. Calcd. for $C_{224}H_{364}Cl_{24}Si_{29}Zr_{12}$: C, 46.25; H, 6.31. Found: C, 46.53; H, 6.11.

$^1H$ NMR (CDCl$_3$): δ −0.113 (s, 18H, Si$^3$CH$_3$), 0.10–0.40 (m, s(overlapped), 42H, Si$^4$CH$_3$, Si$^2$CH$_2$CH$_2$Si$^3$, Si$^3$CH$_2$CH$_2$Si$^4$), 0.47–0.60 (m, 4H, Si$^1$CH$_2$CH$_2$Si$^2$), 6.44 (s, 15H, C$_5$H$_5$), 6.3 (m, 6H, C$_5$H$_4$), 6.68 (m, 6H, C$_5$H$_4$).

$^{13}C$ {$^1H$} NMR (CDCl$_3$):δ$_c$ −4.31 (s, Si$^3$CH$_3$), −2.78 (s, Si$^4$CH$_3$), 2.34 (s(overlapped, broad), Si$^1$CH$_2$, Si$^2$CH$_2$), 6.33 (s, Si$^3$CH$_2$CH$_2$Si$^4$), 6.77 (s, Si$^2$CH$_2$CH$_2$Si$^3$), 8.91 (s, Si$^3$CH$_2$CH$_2$Si$^4$), 115.83 (s, C$_5$H$_5$), 117.01 (s, C$_5$H$_4$), 125.16 (s, C$_5$H$_4$), 125.73 (s, C$_5$H$_4$).

$^{29}Si$ {$^1H$} NMR (CDCl$_3$): δ$_{Si}$ −4.21 (s, Si$^4$C$_5$H$_5$), 4.95 (S, Si$^3$), 8.66 (s(overlapped), Si$^1$, Si$^2$). For the NMR analysis, Si atoms are numbered from the core outward toward the periphery of the dendrimer and that number indicated by a superscript to the right of its chemical symbol.

Example 18
Preparation of $Si[CH_2CH_2SiMe_2CH_2CH_2SiMe_2(C_5H_4)(Me_3SiC_5H_4)TiCl_2]_4$ The following example is provided to demonstrate the coupling of a metallocene-containing compound with a Si—H bond and a dendrimer with vinyl groups at its termini to produce the desired metallocene-containing dendrimer.

A 20 mL Schlenk flask was charged with 532 mg (1.40 mmol) of 5-dimethylhydrogensilylcyclopentadienyl (trimethylsilylcyclopentadienyl)titanium dichloride, 168.0 mg (0.35 mmol) of $Si(CH_2CH_2SiMe_2Vi)_4$, where Vi represents a vinyl functional group, 2.5 mL of THF and 70 μL of the Karstedt catalyst. The reaction mixture was stirred at 50° C. for 4 h, and volatiles were removed at reduced pressure. The red solid that remained was dried in high vacuum, as previously defined, at 60° C. and had a yield of approximately 70% in relation to the reacted vinyl groups of the dendrimer. $^1H$ NMR (CDCl$_3$): δ −0.10–0.60 (m, s(overlapped), 20H. SiCH$_3$, SiCH$_2$), 5.60–6.20 (m, ~1H, CH=CH$_2$), 6.50–6.90 (m, 8H, C$_5$H$_4$) For the NMR analysis, Si atoms are numbered from the core outward toward the periphery of the dendrimer and that number indicated by a superscript to the right of its chemical symbol.

The following Examples 19 and 20 describe preparation of dendrimers suitable for anchoring to a solid phase, such as a refractory oxide.

Example 19
Preparation of $Si(CH_2CH_2SiMe_2)_4(CH_2CH_2SiMe_2(C_5H_5)(C_5H_5)TiCl_2)_{2.5}(CH_2CH_2Si(OMe)_3)_{1.5}$ A 20 mL Schlenk flask was charged with 714 mg (2.14 mmol) of 5-dimethylvinylsilylcyclopentadienyl (cyclopentadienyl)titanium dichloride, 323 mg (0.86 mmol) of $Si(CH_2CH_2SiMe_2H)_4$, 3 mL of THF and 60 μL of the Karstedt catalyst. The reaction mixture was stirred at 40° C. for 0.5 h. and 190 mg (1.285 mmol) of vinyltrimethoxysilane was added to the reaction mixture. The resulting reaction mixture was then stirred at 40° C. for 8 h. All volatiles were removed at reduced pressure. A red, waxy compound remained and had yield 1.22 g (approximately 100%). Anal. Calcd. for $C_{58.5}H_{107}Cl_5O_{4.5}Si_9Ti_{2.5}$: C, 49.06; H, 7.53. Found: C, 48.51; H, 7.28.

$^1$H NMR (CDCl$_3$): δ −0.10–0.07 (s(overlapped), 24H, Si$^2$CH$_3$), 0.22–0.63 (m, 47H, Si$^{3.1}$CH$_3$, SiCH$_2$), 3.552 (s, 13.5H, OCH$_3$), 6.530 (s, 12.5H, C$_5$H$_5$), 6.600 (m, 5H, C$_5$H$_4$), 6.838 (m, 5H, C$_5$H$_4$)

$^{13}$C {$^1$H} NMR (CDCl$_3$):δ$_c$ −4.73 (sg, Si$^2$CH$_3$), −2.90 (sg, Si$^3$CH$_3$), 0.98 (s, Si$^2$CH$_2$CH$_2$Si (OMe)$_3$), 2.28 (s, Si$^1$CH$_2$CH$_2$Si$^2$), 5.19 (s, Si$^2$CH$_2$CH$_2$Si(OMe)$_3$), 6.33 (sg, Si$^1$CH$_2$CH$_2$Si$^2$, Si$^2$CH$_2$CH$_2$SiC$_5$H$_5$), 8.67 (s, Si$^2$CH$_2$CH$_2$SiC$_5$H$_5$), 50.5 (sg, OCH$_3$), 120.3 (sg, C$_5$H$_4$, C$_5$H$_5$), 128.8–131.8 (sg, C$_5$H$_4$), where "sg" denotes a group of signals and "Me" denotes a methyl group. For the NMR analysis, Si atoms are numbered from the core outward toward the periphery of the dendrimer and that number indicated by a superscript to the right of its chemical symbol.

Example 20
Preparation of $Si(CH_2CH_2SiMe_2)_4(CH_2CH_2SiMe_2(C_5H_4)(C_5H_5)ZrCl_2)_{2.5}(CH_2CH_2Si(OMe)_3)_{1.5}$ A 20 mL Schlenk flask was charged with 542 mg (1.44 mmol) of 5-dimethylvinylsilylcyclopentadienyl (cyclopentadienyl)zirconium dichloride, 217 mg (0.58 mmol) of $Si(CH_2CH_2SiMe_2H)_4$, 2 mL of THF and 60 μL of the Karstedt catalyst. The reaction mixture was stirred at 40° C. for 0.5 h. and then 128 mg (0.86 mmol) of vinyltrimethoxysilane was added to the mixture. The resulting reaction mixture was stirred at 40° C. for 8 h. All volatiles were removed at reduced pressure. The residue was dissolved in methylene chloride and filtered through silica gel. After all volatiles were removed, a light brown, waxy compound remained. A yield of 842 mg (95%) was obtained.

Anal. $^1$H NMR (CDCl$_3$): δ −0.10–0.10 (s(overlapped), 24H, Si$^2$CH$_3$), 0.22–0.63 (m, 47H, Si$^{3.1}$CH$_3$, SiCH$_2$), 3.56 (s, 13.5H, OCH$_3$), 6.43 (s, 12.5H, C$_5$H$_5$), 6.52 (m, 5H, C$_5$H$_4$), 6.68 (m, 5H, C$_5$H$_4$).

For the NMR analysis, Si atoms are numbered from the core outward toward the periphery of the dendrimer and that number indicated by a superscript to the right of its chemical symbol.

The following Examples 21 and 22 demonstrate the use of dendrimers with Group 4 metallocene termini as catalysts.

Example 21
Polymerization of Phenylsilane Induced by $Si[CH_2CH_2SiMe_2CH_2CH_2SiMe_2(C_5H_4) (C_5H_5)ZrCl_2]_4$ A 25 mL Schlenk flask equipped with a rubber septum was charged with a stir bar, 127 mg (67.4 μmol) of $Si[CH_2CH_2SiMe_2CH_2CH_2SiMe_2(C_5H_4) (C_5H_5)ZrCl_2]_4$ and 4 mL of toluene. The mixture was cooled to −10° C. and 0.21 mL (0.53 mmol) of a 2.5M solution of n-butyllithium in hexane was injected by syringe. After stirring for 5 min at 0° C., 2.0 g (18.5 mmol) of phenylsilane, PhSiH$_3$, was injected into the flask, forming a light yellow, clear solution. Vigorous bubbling occurred immediately upon introduction of the phenylsilane. After removal of the ice bath, and within 15 min of being exposed to room temperature, the reaction mixture became red. After stirring for 1 h at room temperature, 4 mL of n-hexane was added and the reaction mixture was filtered through Celite™. Then, all volatiles were removed at reduced pressure leaving a yellow, waxy compound that was dried in vacuum with yield 1.8 g (91.6%). Spectroscopic evidence, including NMR and infrared (IR) spectroscopic data, showed the compound to be a poly(phenylsilane). Anal. Calcd. for H(PhSiH)$_x$H: C, 67.8; H, 5.7. Found: C, 67.2; H, 5.8.

$^1$H NMR (CD$_2$Cl$_2$): δ 3.65–5.10(m(broad), 1H, SiH), 6.50–7.50 (m(broad), 5.8H, C$_5$H$_5$).

IR 3065 cm$^{-1}$ (C—H), 2106 cm$^{-1}$ (Si—H).

Example 22
Polymerization of Phenylsilane Induced by $Si[CH_2CH_2SiMe(CH_2CH_2SiMe_2CH_2CH_2SiMe_2(C_5H_4)(C_5H_5)ZrCl_2)_2]_4$ A 25 mL Schlenk flask equipped with a rubber septum was charged with a stir bar, 146 mg (36.3 μmol) of $Si[CH_2CH_2SiMe(CH_2CH_2SiMe_2CH_2CH_2SiMe_2 (C_5H_4)(C_5H_5)ZrCl_2)_2]_4$ and 4 mL of toluene. The mixture was cooled to −10° C. and 0.23 mL (0.57 mmol) of a 2.5M solution of n-butyllithium in hexane was injected by syringe. After stirring for 7 min at −10° C., 2.1 g (19.4 mmol) of phenylsilane, was injected into the flask, forming a light yellow, clear solution. Vigorous bubbling occurred immediately upon introduction of the phenylsilane. After 10 min, the ice bath was removed, and within 10 min of being exposed to room temperature, the reaction mixture became red. After stirring for 50 min at room temperature, 4 mL of n-hexane was added and the reaction mixture was filtered through Celite™. Then, all volatiles were removed at reduced pressure leaving an orange, waxy compound that was dried in vacuum with yield 1.95 g (95%). Spectroscopic evidence, including NMR and infrared (IR) spectroscopic data, showed the compound to be a poly(phenylsilane). Anal. Calcd. for H(PhSiH)$_x$H: C, 67.8; H, 5.7. Found: C, 67.7; H, 5.8.

$^1$H NMR ((CD$_3$)$_2$CO): δ 3.70–5.30(m(broad), 1H, SiH), 6.60–7.85 (m(broad), 5.2H, C$_5$H$_5$).

IR 3065 cm$^{-1}$ (C—H), 2106 cm$^{-1}$ (Si—H)

The following Examples 23–27 are provided to demonstrate the use of the catalysts of the invention for catalysis of olefin polymerization.

Example 23
Homopolymerization of Ethylene

A 250 ml four-necked flask equipped with reflux condenser, magnetic stir bar, inside thermometer, nitrogen inlet/outlet and a gas inlet tube was filled with 100 ml toluene, 0.66 ml MAO solution (10b by weight in toluene) and 0.5 ml of a 0.002 M solution of (Si[CH$_2$CH$_2$SiMe$_2$CH$_2$CH$_2$SiMe$_2$C$_5$H$_4$(C$_5$H$_5$)ZrCl$_2$]$_4$), described in Example 10, in toluene. This solution was stirred for 20 minutes to activate the catalyst The catalyst solution was then heated to 40° C. and held at this temperature. Ethylene was bubbled through the system for 15 minutes. The reaction was stopped by addition of a 50 ml methanol solution containing 0.5 ml 1 N HCl. The polymer was then filtered and washed several times with methanol. Finally, the polymer was dried in vacuum at 50° C. for 20 hours yielding 1.44 g polyethylene, which translates to a catalyst activity of 5760 kg/mol-hour.

Example 24
Copolymerization of Ethylene with Propylene

The polymerization was done as described for Example 23 using 5 ml of 0.002 M solution of (Si[CH$_2$CH$_2$SiMe$_2$CH$_2$CH$_2$SiMe$_2$C$_5$H$_4$(C$_5$H$_5$)ZrCl$_2$]$_4$), described in Example 10, and bubbling a mixture of ethylene/propylene (1:1 by volume), through the system. The polymerization was done at 20° C. for 60 minutes providing 14.6 g of a sticky copolymer, which translates to a catalyst activity of 1460 kg/mol·hour.

Example 25
Homopolymerization of Cyclopentene

A 250 ml two-necked flask equipped with septa, magnetic stir bar, nitrogen inlet and outlet was filled in an inert atmosphere box with 6.5 mg of (Si[CH$_2$CH$_2$SiMe$_2$CH$_2$CH$_2$SiMe(C$_5$H$_4$)$_2$ZrCl$_2$]$_4$), in Example 14. The catalyst was then dissolved in 20 ml MAO solution. The flask was transferred out of the inert atmosphere box and the homogeneous solution was stirred for 0.5 hours to activate the catalyst.

In a separate Schlenk tube, which was flame dried under nitrogen flow, 30 ml cyclopentene and 10 ml MAO solution were mixed. This solution was transferred in an air tight syringe to the preactivated catalyst/cocatalyst solution. The thus-obtained solution was then stirred for 24 hours at 25° C. After this time period, a solution of 50 ml ethanol containing 20% 1 N HCl was carefully added. The solution was then stirred for 5 hours to remove cocatalyst residues. The white polymer was filtered and washed several times with methanol and then acetone. The polymer was then dried for 24 hours in a vacuum oven at 80° C., yielding 2.5 g of a white crystalline polymer which is insoluble in common solvents at room temperature. The catalyst activity is 29 kg/mol·hour. Differential scanning calorimetry (DSC) shows no melting point before decomposition of the material.

Example 26
Homopolymerization of 1-Hexene

A 250 ml two-necked flask equipped with septa, magnetic stir bar, nitrogen inlet and outlet was filled in an inert atmosphere box with 4.0 mg of (Si[CH$_2$CH$_2$SiMe$_2$CH$_2$CH$_2$SiMe(C$_5$H$_4$)$_2$ZrCl$_2$]$_4$), described in Example 14. The catalyst was then dissolved in 20 ml MAO solution. The flask was transferred out of the inert atmosphere box and the homogeneous solution was stirred for 0.5 hours to activate the catalyst.

In a separate Schlenk-tube, which was flame dried under nitrogen flow, 20 ml 1-hexene and 10 ml MAO solution were mixed. This solution was transferred in an air tight syringe to the preactivated catalyst/cocatalyst solution. The obtained solution was then stirred for 7 days at 25° C. The polymerization was stopped by addition of 50 ml of ethanol. The obtained cocatalyst residues were filtered. The remaining solution was concentrated at the rotavap leading to a clear, low viscosity, atactic polyhexene, which was dried in vacuum at 60° C. for 24 hours. The yield was 4.1 g, which translates to a catalyst activity of 11 kg/mol·hour.

Example 27
Copolymerization of 1-Hexene with Cyclopentene

A 250 ml two-necked flask equipped with septa, magnetic stir bar, and nitrogen inlet and outlet was filled in an inert atmosphere box with 4.0 mg of (Si[CH$_2$CH$_2$SiMe$_2$CH$_2$CH$_2$SiMe(C$_5$H$_4$)$_2$ZrCl$_2$]$_4$), described in Example 14. The catalyst was then dissolved in 20 ml MAO solution. The flask was transferred out of the inert atmosphere box and the homogeneous solution was stirred for 0.5 hours to activate the catalyst.

In a separate Schlenk-tube, which was flame dried under nitrogen flow, 10 ml 1-hexene, 10 ml cyclopentene and 10 ml MAO solution were mixed. This solution was transferred in an air tight syringe to the preactivated catalyst/cocatalyst solution. The thus-obtained solution was then stirred for 4 days at 25° C. After this time period, a solution of 50 ml ethanol containing 20% 1 N HCl was carefully added and stirred for 5 hours to remove cocatalyst residues. The polymer was filtered and washed several times with methanol and acetone. The polymer was then dried for 24 hours in a vacuum oven at 80° C., yielding 3.2 g of a white, wax-type polymer, which translates to a catalyst activity of 15 kg/mol·hour.

What is claimed is:

1. A method for polymerizing an olefin comprising:
   (a) providing one or more olefin monomers;
   (b) providing an organosilicon dendrimer catalyst, including a dendrimer arm including a Group 4 metal selected from the group consisting of Ti, Zr, and Hf and mixtures thereof; and
   (c) contacting said monomers with said organosilicon dendrimer catalyst so that said olefin monomers are polymerized to form a polyolefin.

2. The method of claim 1 wherein said olefin monomers are ethylene and further including providing a co-catalyst selected from the group consisting of methylalumoxane (MAO), B(C$_6$F$_6$)$_3$, a Ph$_3$C$^+$ salt of the (C$_6$F$_5$)$_4$B$^-$ anion, and an organic ammonium salt of the (C$_6$F$_5$)$_4$B$^-$ anion.

3. The method of claim 1 wherein said monomers are α-olefin monomers and further including providing a co-catalyst selected from the group consisting of methylalumoxane (MAO), B(C$_6$F$_5$)$_3$, a Ph$_3$C$^+$ salt of the (C$_6$F$_5$)$_4$B$^-$ anion, and an organic ammonium salt of the (C$_6$F$_5$)$_4$B$^-$ anion.

4. The method of claim 3 wherein said α-olefin monomers are selected from the group consisting of propylene, 1-butene, styrene, and higher α-olefins.

5. The method of claim 1 wherein said olefin monomers are selected from the group consisting of cyclic olefins.

6. The method of claim 5 wherein said cyclic olefins are selected from the group consisting of cyclopentene, and norbornene.

7. The method of claim 1 wherein said olefin monomers are selected from the group consisting of 1,3-dienes.

8. The method of claim 7 wherein said 1,3-dienes are selected from the group consisting of 1,3-butadiene and isoprene.

9. The method of claim 1 wherein step (a) further includes providing a first monomer, having a first chemical composition and a second monomer having a second chemical composition different from said first chemical composition, so that said monomers are copolymerized and said polyolefin is a copolymer.

10. The method of claim 9 wherein said first and second monomers are selected from the group consisting of ethylene, α-olefins, cyclic olefins and 1,3-dienes and mixtures thereof.

* * * * *